(12) United States Patent
Cowper et al.

(10) Patent No.: US 12,084,132 B2
(45) Date of Patent: Sep. 10, 2024

(54) MOTOR DRIVE ASSEMBLY FOR A DUAL PATH ELECTRIC POWERTRAIN OF A MACHINE

(71) Applicant: Caterpillar Inc., Peoria, IL (US)

(72) Inventors: Lance Cowper, Metamora, IL (US); Joseph D. Tigue, Peoria, IL (US); Daniel D. Bell, Peoria, IL (US); Michael D. Betz, Knoxville, IL (US); Stephen C. Garnett, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 1303 days.

(21) Appl. No.: 16/715,915

(22) Filed: Dec. 16, 2019

(65) Prior Publication Data

US 2021/0179170 A1   Jun. 17, 2021

(51) Int. Cl.

| | | |
|---|---|---|
| *B62D 55/00* | (2006.01) | |
| *B60K 7/00* | (2006.01) | |
| *B62D 21/18* | (2006.01) | |
| *B62D 55/06* | (2006.01) | |
| *B62D 55/125* | (2006.01) | |
| *E02F 3/76* | (2006.01) | |
| *E02F 3/84* | (2006.01) | |
| *E02F 9/02* | (2006.01) | |
| *E02F 9/08* | (2006.01) | |
| *E02F 9/20* | (2006.01) | |

(52) U.S. Cl.
CPC .......... *B62D 55/125* (2013.01); *B60K 7/0007* (2013.01); *B62D 21/186* (2013.01); *B62D 55/06* (2013.01); *E02F 3/7609* (2013.01); *E02F 3/84* (2013.01); *E02F 9/02* (2013.01); *E02F 9/0808* (2013.01); *E02F 9/2079* (2013.01); *B60K 2007/0092* (2013.01); *E02F 3/7604* (2013.01)

(58) Field of Classification Search
CPC .... B62D 55/125; B62D 55/06; B62D 21/186; B60K 7/0007; B60K 2007/0092; E02F 3/7609; E02F 3/84; E02F 3/7604; E02F 9/02; E02F 9/0808; E02F 9/2079; E02F 9/2095; B60Y 2200/25; F16H 57/10
See application file for complete search history.

(56) References Cited

U.S. PATENT DOCUMENTS

| | | | |
|---|---|---|---|
| 4,554,989 A | | 11/1985 | Gruich |
| 4,998,591 A | * | 3/1991 | Zaunberger ............ B62D 11/10 180/6.7 |
| 5,919,109 A | * | 7/1999 | Fleckenstein ........ B60K 17/046 475/151 |
| 6,216,807 B1 | | 4/2001 | Eckhoff |

(Continued)

*Primary Examiner* — Phutthiwat Wongwian
*Assistant Examiner* — Sherman D Manley
(74) *Attorney, Agent, or Firm* — Harrity & Harrity LLP

(57) ABSTRACT

A motor drive assembly for a dual path electric powertrain of a machine is disclosed. The motor drive assembly may include a final drive assembly to engage a ground engaging element of the machine. The motor drive assembly may include an electric motor to provide torque to the final drive assembly. The motor drive assembly may include a planetary gear assembly mechanically coupled to a rotor shaft of the electric motor and an axle of the final drive assembly. The motor drive assembly may include a brake assembly to engage a component of the planetary gear assembly to retard the rotor shaft and the axle.

20 Claims, 4 Drawing Sheets

(56) References Cited

U.S. PATENT DOCUMENTS

| | | | |
|---|---|---|---|
| 6,358,176 B1* | 3/2002 | Nauheimer | B60K 17/046 |
| | | | 180/65.6 |
| 6,691,806 B2* | 2/2004 | Wolfgang | B62D 55/00 |
| | | | 180/65.265 |
| 7,658,250 B2* | 2/2010 | Betz | B60L 1/003 |
| | | | 180/65.8 |
| 7,950,481 B2* | 5/2011 | Betz | B60K 6/46 |
| | | | 180/6.44 |
| 10,611,232 B2* | 4/2020 | Tigue | B62D 55/125 |
| 10,889,341 B2* | 1/2021 | Warr | B62D 55/08 |
| 2004/0069542 A1* | 4/2004 | Simmons | B62D 11/16 |
| | | | 180/6.2 |
| 2004/0116228 A1* | 6/2004 | Thompson | B62D 11/16 |
| | | | 475/19 |
| 2007/0080236 A1* | 4/2007 | Betz | B60K 6/46 |
| | | | 237/12.1 |
| 2008/0121448 A1* | 5/2008 | Betz | B60L 1/003 |
| | | | 180/9.1 |
| 2016/0096548 A1* | 4/2016 | Tigue | H02K 7/14 |
| | | | 180/6.7 |
| 2016/0096563 A1* | 4/2016 | Tigue | B62D 11/04 |
| | | | 29/401.1 |
| 2016/0097185 A1* | 4/2016 | Tigue | E02F 9/2087 |
| | | | 180/6.7 |
| 2016/0311310 A1 | 10/2016 | Muenst | |
| 2017/0152937 A1* | 6/2017 | Schlack | F16H 57/0486 |
| 2017/0350495 A1 | 12/2017 | Iijima et al. | |
| 2020/0070644 A1* | 3/2020 | Tigue | B62D 55/06 |
| 2021/0179170 A1* | 6/2021 | Cowper | E02F 9/02 |

* cited by examiner

MOTOR DRIVE ASSEMBLY FOR A DUAL PATH ELECTRIC POWERTRAIN OF A MACHINE

TECHNICAL FIELD

The present disclosure relates generally to a powertrain of a machine and, for example, to a motor drive assembly for a dual path electric powertrain of a machine.

BACKGROUND

An electric powertrain or drive may be used as a source of driving power in a machine, such as, for example, a track-type tractor (e.g., an excavator, a bulldozer, and/or the like). The electric powertrain may drive, using power provided by an internal combustion engine, ground engaging elements of the machine to cause the machine to move. Using the electric powertrain to supplement the internal combustion engine may reduce emissions generated during operation of the machine and may increase fuel efficiency of the machine. In operation, the electric powertrain may generate an output torque that is transferred to ground engaging components on the machine (e.g., such as tracks on a track-type tractor).

Generally, an electric powertrain for a relatively large machine (e.g., a machine with an operational mass over 45,000 kilograms (kg)) requires certain minimum performance capabilities and/or performance standards that enable a certain level of steering responsiveness, drawbar pull, propulsion power, retarding power, and/or the like for operations of the machine. Furthermore, to meet such performance capabilities and/or performance standards, previous designs and/or configurations of motor drive assemblies for electric powertrains of machines that include a single motor on each drive element of the machine may result in motor drive assemblies that are physically too large to fit within a desired compartment and/or configuration of the machine (e.g., in association with certain desired packaging, inertia, weight, cost, and/or the like).

One approach for an electric powertrain for a work machine is disclosed in U.S. Pat. No. 7,950,481 that issued to Betz et al. on May 31, 2011 ("the '481 patent"). In particular, the '481 patent discloses two electric motors respectively coupled to driving members and power electronics that control the two electric motors such that the two electric motors may operate in a coordinated manner to propel the work machine. Furthermore, the '481 patent discloses braking devices configured to selectively apply a braking force resulting in a slowing of either or both driving members.

The motor drive assembly of the present disclosure provides one or more additional benefits to solve one or more of the problems set forth above and/or one or more other problems in the art.

SUMMARY

According to some implementations, a motor drive assembly for a machine may include a final drive assembly to engage a ground engaging element of the machine; an electric motor to provide torque to the final drive assembly; a planetary gear assembly mechanically coupled to a rotor shaft of the electric motor and an axle of the final drive assembly; and a brake assembly to engage a component of the planetary gear assembly to retard the rotor shaft and the axle.

According to some implementations, a dual path electric powertrain for a machine may include a first motor drive assembly that is positioned toward a first lateral side of the machine, the first motor drive assembly including a first final drive assembly to engage a first ground engaging element of the machine, a first electric motor to provide torque to the first final drive assembly, a first planetary gear assembly mechanically coupled to a first rotor shaft of the first electric motor and a first axle of the first final drive assembly, and a first brake assembly to engage a component of the first planetary gear assembly to retard the first rotor shaft and the first axle; and a second motor drive assembly positioned toward a second lateral side of the machine that is opposite the first lateral side, the second motor drive assembly being coaxially aligned with the first motor drive assembly and including: a second final drive assembly to engage a second ground engaging element of the machine, a second electric motor to provide torque to the second final drive assembly, a second planetary gear assembly mechanically coupled to a second rotor shaft of the second electric motor and a second axle of the second final drive assembly, and a second brake assembly to engage a component of the second planetary gear assembly to retard the second rotor shaft and the second axle.

According to some implementations, a machine may include a power source; and a dual path electric powertrain powered by the power source, the dual path electric powertrain including: a left-side motor drive assembly positioned on a left-side of the machine, the left-side motor drive assembly including: a left-side final drive assembly to drive a left-side track of the machine, a left-side electric motor to provide torque to the left-side final drive assembly, a left-side planetary gear assembly mechanically coupled to a left-side rotor shaft of the left-side electric motor and a left-side axle of the left-side final drive assembly, and a left-side brake assembly to engage the left-side planetary gear assembly to retard the left-side rotor shaft and the left-side axle; and a right-side motor drive assembly positioned on a right-side of the machine, the right-side motor drive assembly being coaxially aligned with the left-side motor drive assembly and including: a right-side final drive assembly to drive a right-side track of the machine, a right-side electric motor to provide torque to the right-side final drive assembly, a right-side planetary gear assembly mechanically coupled to a right-side rotor shaft of the right-side electric motor and a right-side axle of the right-side final drive assembly, and a right-side brake assembly to engage the right-side planetary gear assembly to retard the right-side rotor shaft and the right-side axle.

DETAILED DESCRIPTION

Figure 1:
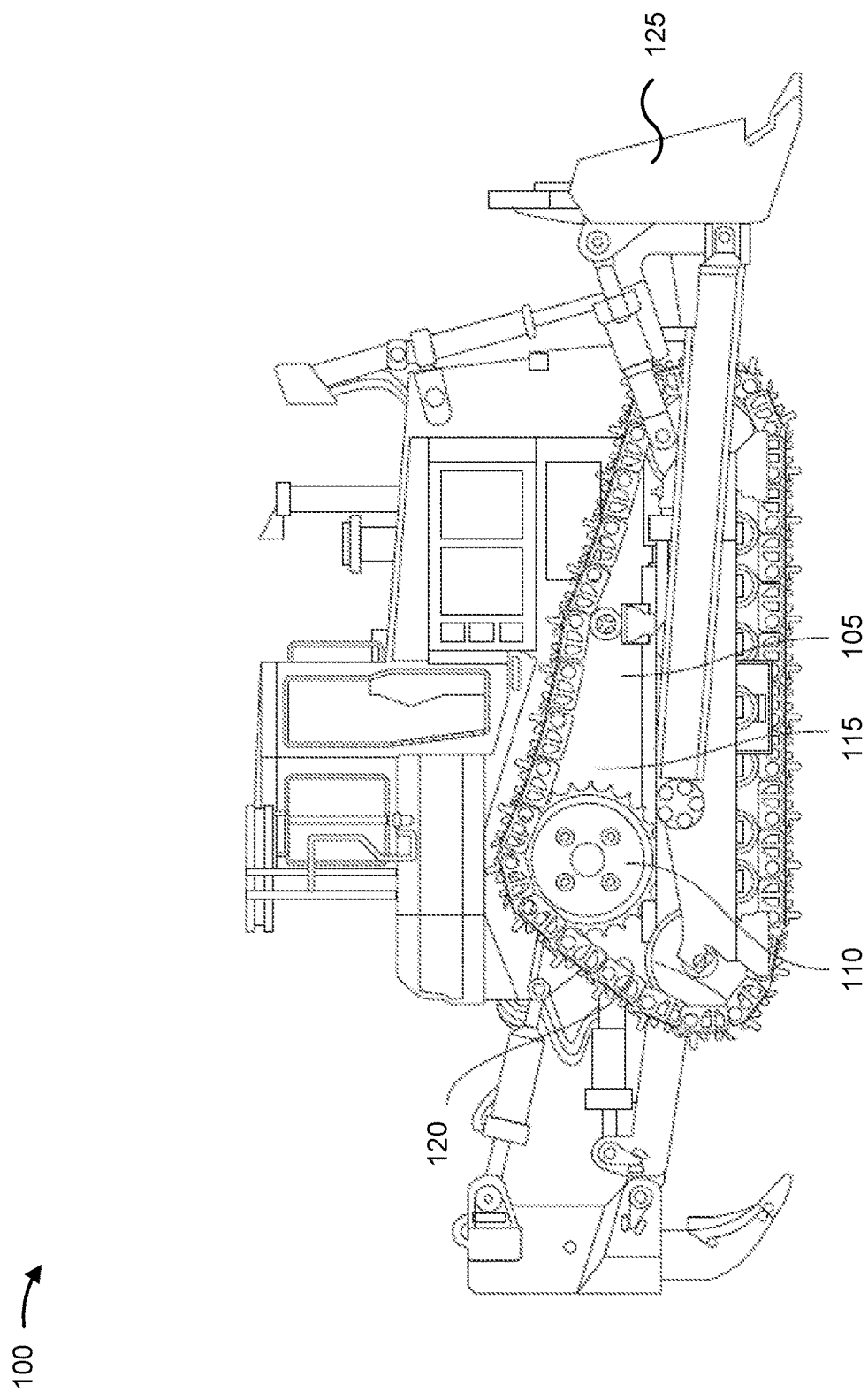
FIG. 1 is a side view of an example machine in which an example motor drive assembly described herein may be implemented.

FIG. 1 is a side view of an example machine 100 (shown as a track-type tractor) in which a dual path electric powertrain described herein may be implemented.

As shown in FIG. 1, machine 100 may include a frame 105 that encloses and/or supports a power source (e.g., an internal combustion engine) and/or one or more components of a dual path electric powertrain described herein. For example, machine 100 may include an engine, a generator, an inverter, and/or one or more electrical lines, fluid lines, and/or the like to control motor drive assemblies of the dual path electric powertrain to drive final drive assemblies 110 of machine 100.

A generator includes a device that converts mechanical energy into electrical energy for use in an electrical system of machine 100 (e.g., the dual path electric powertrain, a battery, and/or the like). Such mechanical energy may be provided by the power source of machine 100 to power motor drive assemblies of the dual path electric powertrain and/or received from motor drive assemblies (e.g., during braking and/or retarding operation) of machine 100 for storage in a battery of machine 100 and/or use in one or more other electrical systems of machine 100.

An inverter may include one or more electrical devices or components that manipulate electrical power of an electrical system of machine 100. For example, the inverter may filter (or clean) and/or route electrical power to motor drive assemblies of the dual path electric powertrain, to a battery, and/or to one or more other electrical systems of machine 100. In this way, power and/or current may flow from the generator to the inverter (e.g., to control power to the motor drive assemblies) and/or from the motor drive assemblies to the inverter (e.g., to absorb power from the motor drive assemblies).

Machine 100 may include one or more electronic control modules (ECMs) that control the power of the dual path electric powertrain described herein. For example, an ECM may include a processor and/or memory component to control the dual path electric powertrain described herein according to one or more inputs (e.g., from an operator station of machine 100), one or more conditions of machine 100 (e.g., as sensed by one or more sensors of machine 100), and/or the like.

A motor drive assembly of the dual path electric powertrain may include a final drive assembly 110, on each side 115 of machine 100, that is mechanically configured to engage and/or support a ground engaging element 120 (e.g., a track chain, a wheel, or other type of ground engaging element). Accordingly, movement of machine 100 may correspond to rotation of final drive assemblies 110 and, correspondingly, ground engaging elements 120. In the example of FIG. 1, machine 100 includes a blade 125 (e.g., to move ground material or other substances). As described herein, ground engaging elements 120 may include a set of tracks. A dual path electric powertrain, as described herein, may provide propulsion and braking capabilities for machine 100 with a threshold blade width to track gauge ratio (e.g., when a between 1.0 and 3.0). A track gauge may correspond to a distance between a center line of each track of a track-type tractor.

As indicated above, FIG. 1 is provided as an example. Other examples may differ from what is described in connection with FIG. 1. In some implementations, machine 100 may include additional components, fewer components, different components (e.g., a different implement other than blade 125), or differently arranged components than those shown in FIG. 1.

Figure 2:
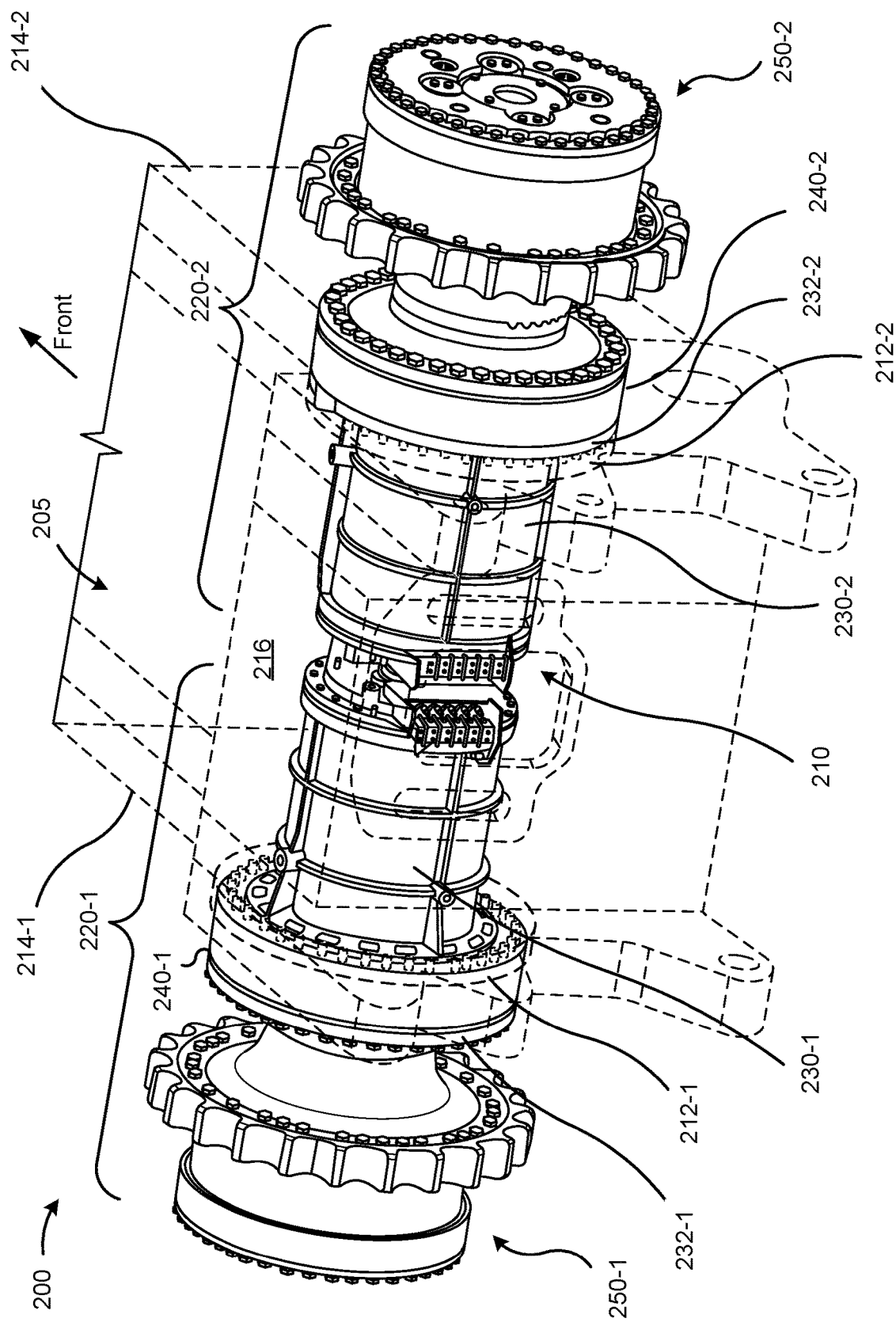
FIG. 2 is an isometric view of an example dual path electric powertrain that may be implemented, as described herein, within the machine of FIG. 1.

FIG. 2 is an isometric view of an example dual path electric powertrain 200 that may be implemented, as described herein, within machine 100 of FIG. 1. As shown in FIG. 2, frame 205 (shown with dashed lines, and corresponding to frame 105) forms an electric motor cavity 210 that is axially situated between frame mounts 212 (shown as "212-1" and "212-2") on a left-side 214-1 and right-side 214-2 of frame 205. Electric motor cavity 210 may be a compartment of frame 205 formed beneath a support structure 216 of frame 205 that is configured to provide structural integrity to frame 205 and/or support one or more components or systems of machine 100 (e.g., an operator station). Dual path electric powertrain 200 includes two motor drive assemblies 220 (shown as, and referred to herein, individually as a "left motor drive assembly 220-1" and a "right motor drive assembly 220-2") mounted, via frame mounts 212, to frame 205.

Motor drive assemblies 220 enable dual path electric powertrain 200 via a set of modular components. In FIG. 2, the modular components include motor assemblies 230 (shown as and referred to herein as a "left motor assembly 230-1" and a "right motor assembly 230-2"), brake assemblies 240 (shown as and referred to herein as a "left brake assembly 240-1" and a "right brake assembly 240-2"), and final drive assemblies 250 (shown as and referred to herein as a "left final drive assembly 250-1" and a "right final drive assembly 250-2").

Left motor drive assembly 220-1 is shown mounted (e.g., with fasteners such as bolts for mechanical attachment, with electrical connections being connected, with fluid passageways being joined, and/or the like) to a left-side 214-1 of frame 205 such that a motor housing of left motor assembly 230-1 is positioned within electric motor cavity 210, and brake assembly 240-1 is positioned outside of electric motor cavity 210. Similarly, right motor drive assembly 220-2 is shown mounted to a right-side 214-2 of frame 205 such that a motor housing of right motor assembly 230-2 is positioned within electric motor cavity 210, and right brake assembly 240-2 is positioned outside of electric motor cavity 210. Accordingly, in the example of FIG. 2, other than mounting flanges 232 (shown as "232-1" and "232-2") of the motor assemblies 230, the remainder of the motor housings of motor assemblies 230 are within a bore (e.g., an opening of frame 205 that receives a motor drive assembly 220) of frame 205 and/or electric motor cavity 210.

According to some implementations, brake assemblies 240 of motor drive assemblies 220 may be included within electric motor cavity 210. The position of brake assemblies 240 may be based on a design and/or dimensions of components of a configuration of motor drive assemblies 220 described herein, a design and/or configuration of machine 100, and/or the like. For example, for relatively smaller machines (e.g., machines with an operating mass of less than 60,000 kg) motor assemblies 220 may be configured to have brake assemblies 240 positioned within electric motor cavity 210, relatively medium sized machines (e.g., machines with an operating mass between 60,000 kg and 100,000 kg), motor drive assemblies 220 may be configured to have brake assemblies 240 either positioned within electric motor cavity 210 or outside of electric motor cavity (e.g., depending on a size and/or shape of frame 205), and for relatively larger machines (e.g., machines with an operating mass greater than 100,000 kg) motor assemblies 220 may be configured to have brake assemblies positioned outside of electric motor cavity 210. Such positioning of brake assemblies 240 in various machines 100 may depend on axial lengths of motors of motor assemblies 230 and an axial width of electric motor cavity 210.

Left motor drive assembly 220-1 may be coaxially aligned with right motor drive assembly 220-2. For example, a rotor shaft of left motor assembly 230-1 may be coaxially aligned with a rotor shaft of right motor assembly 230-2. Additionally, or alternatively, an axle of left final drive assembly 250-1 may be coaxially aligned with an axle of right final drive assembly 250-2. Accordingly, as shown, motor drive assemblies 220 may be adjacently aligned with one another when mounted within frame 205 for operation of machine 100.

In some implementations, left motor drive assembly 220-1 can be a same type of motor drive assembly as right motor drive assembly 220-2. Correspondingly, left motor assembly 230-1, left brake assembly 240-1, and left final drive assembly 250-1 may be a same type of motor assembly, brake assembly, and final drive assembly as right motor assembly 230-2, right brake assembly 240-2, and right final drive assembly 250-2, respectively. Multiple components may be considered to be a same type based on being associated with a same make/manufacture, being identified by a same model number (or serial number, part number, etc.), having the same dimensions, having the same design or performance specifications, and/or the like.

As indicated above, FIG. 2 is provided as an example. Other examples may differ from what is described in connection with FIG. 2. In some implementations, dual path electric powertrain 200 may include additional components (e.g., a clutch system, such as a slip clutch), fewer components, different components, or differently arranged components than those shown in FIG. 2.

Figure 3:
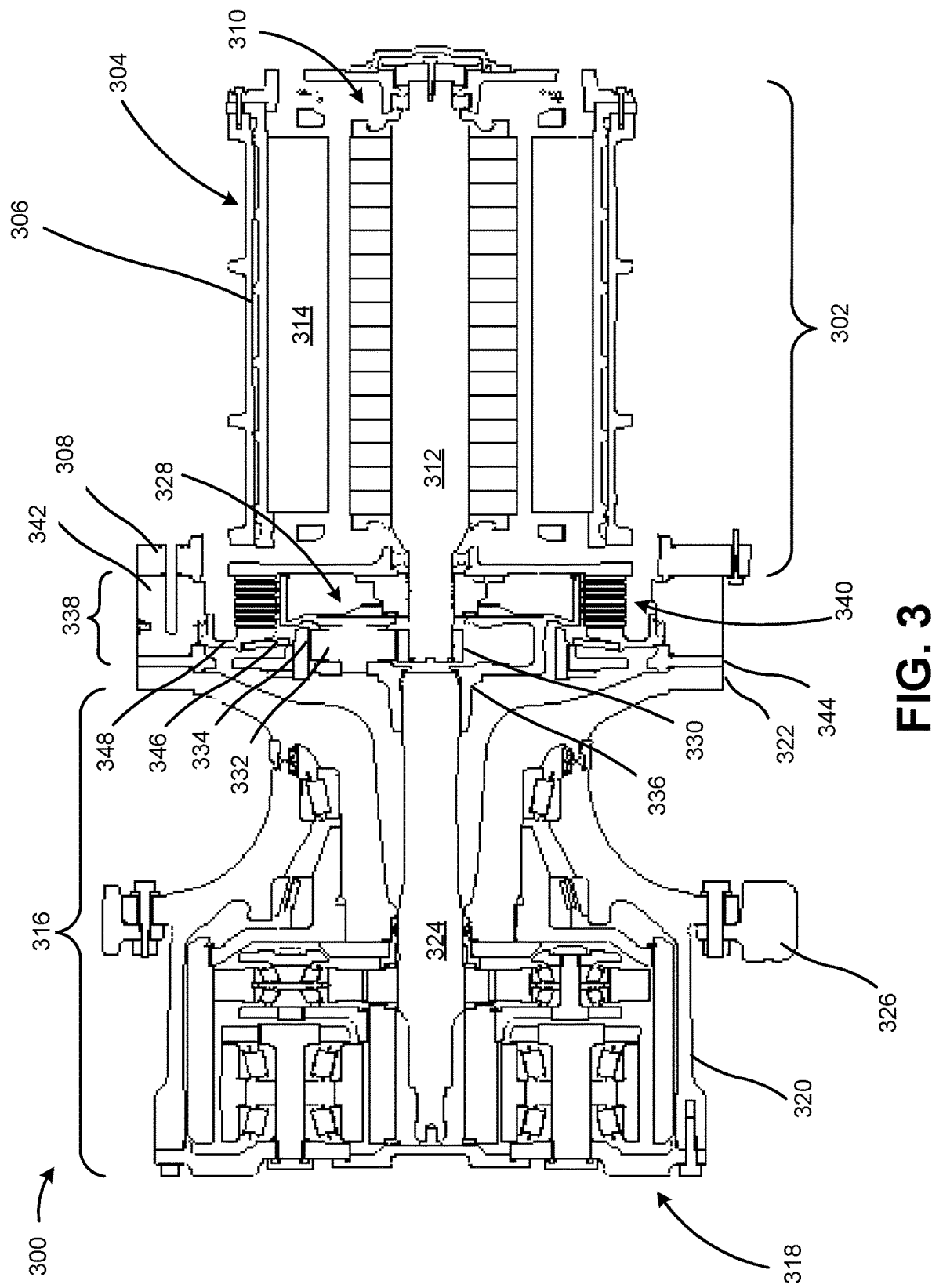
FIG. 3 is a diagram of an example motor drive assembly that may be implemented within the dual path electric powertrain of FIG. 2.

FIG. 3 is a diagram of an example motor drive assembly 300 that may be implemented within dual path electric powertrain 200 of FIG. 2. Motor drive assembly 300 may correspond to left motor drive assembly 220-1 and/or right motor drive assembly 220-2.

As used herein, components are "mechanically coupled" when the components are attached to (e.g., fastened to, fit to, adhered to, and/or the like via one or more fasteners, couplings, bearing assemblies, and/or the like) and/or in contact with one another indirectly via one or more intervening parts, or directly (without any intervening components other than fasteners or couplings that connect the components). Further, as used herein, components are "mechanically connected" when the components are attached to one another and/or in contact with one another without any intervening components (other than fasteners or couplings).

Motor drive assembly 300 includes a motor assembly 302 that includes an electric motor 304, a motor housing 306 with a motor mounting flange 308 (e.g., corresponding to mounting flange 232), a rotor 310 with a rotor shaft 312, and a stator 314. Electric motor 304 may be a switched reluctance motor that provides mechanical power (e.g., rotational mechanical power) via rotor shaft 312 (e.g., to drive ground engaging element 120 of machine 100) and/or absorbs rotational power from rotor shaft 312 (e.g., when electric motor 304 is performing as a generator to provide electrical energy to an electrical system of machine 100). Rotor 310 may have a length to diameter (L/D) ratio between 0.5 and 2.2, where the length and the diameter correspond to a lamination stack length and a lamination diameter of rotor 310.

Motor drive assembly 300 includes a final drive assembly 316 that includes a final drive 318, a final drive housing 320 with a drive mounting flange 322, an axle 324 (e.g., an input shaft of final drive 318), and a sprocket 326 that is configured to engage with ground engaging element 120. Final drive 318 may include one or more final drive gear assemblies (e.g., positioned within final drive housing 320) that provide a gear reduction between rotations of axle 324 and sprocket 326.

Motor drive assembly 300 includes a gear assembly 328 with a sun gear 330, one or more planet gears 332, a ring gear 334, and a carrier 336. As shown, gear assembly 328 includes a sun-in, carrier-out planetary gear assembly. Gear assembly 328 may provide a gear reduction (e.g., a gear reduction between 2.5 and 6.5) between rotational speeds rotor of shaft 312 (and correspondingly, sun gear 330) and carrier 336.

Motor drive assembly 300 includes brake assembly 338 with a brake pack 340, a brake housing 342 with a spring retainer plate 344, a brake spring 346, and a brake piston 348. Brake assembly 338 may include a wet disc brake assembly that is configured to retard (or provide retarding power) rotation of rotor shaft 312 and axle 324 (and, correspondingly, ground engaging element 120 of machine 100). For example, brake spring 346 may be configured to apply a force against brake piston 348, which is situated between brake pack 340 and brake spring 346. Accordingly, when brake piston 348 is controlled to reduce a force against brake spring 346, brake spring 346 is able to apply a force (e.g., through brake piston 348) to brake pack 340 (e.g., to compress brake pack 340 to slow rotation of (and/or provide a retarding force on) rotor shaft 312 and axle 324). Alternatively, brake piston 348, when controlled to apply force against brake spring 346 may reduce or remove any force against brake pack 340 (e.g., to permit rotation of rotor shaft 312 and axle 324).

As shown in FIG. 3, electric motor 304 is configured within motor drive assembly 300, such that when motor drive assembly 300 is mounted to frame 105 of machine 100, electric motor 304 is within electric motor cavity 210. Electric motor 304 may be configured as a high torque switched reluctance motor that is capable of providing torque to rotor shaft 312 to enable movement of machine 100. For example, electric motor 304, according to the configuration of motor drive assembly 300, may provide enough torque to satisfy one or more performance requirements associated with machine 100, as described herein.

Gear assembly 328 operates according to rotation of rotor shaft 312 and/or axle 324. As shown, rotor shaft 312 extends from motor housing 306 beyond motor mounting flange 308 to engage with sun gear 330 (e.g., via splines of rotor shaft 312 and/or gear teeth of sun gear 330). Furthermore, sun gear 330 is mechanically coupled to planet gears 332, which are mechanically coupled to ring gear 334. Carrier 336, of gear assembly 328, is mechanically connected to planet gears 332 (e.g., carrier 336 may be fit within bearing assemblies associated with planet gears 332) and axle 324 (e.g., via one or more splines of axle 324 and/or carrier 336). Accordingly, torque from rotor shaft 312 may cause gear assembly 328 to drive axle 324 (e.g., to drive ground engaging element 120), and torque from axle 324 may cause gear assembly 328 to drive rotor shaft 312 (e.g., to enable electric motor 304 to generate electrical energy).

As shown, gear assembly 328 is fit within brake housing 342 (e.g., or enclosed within brake housing 342 between spring retainer plate 344 and motor mounting flange 308). Accordingly, gear assembly 328 may be axially positioned between motor mounting flange 308 of motor assembly 302 and spring retainer plate 344 of brake assembly 338. In some implementations, ring gear 334 is fixed (or splined) relative to a gear reaction hub of brake assembly 338. For example, ring gear 334 may be fixed or splined with brake housing 342 (e.g., to prevent rotation of ring gear 334 when sun gear 330 and/or planet gears 332 are rotating) and/or spring plate 344. As shown, gear assembly 328 is positioned within brake housing 342, toward final drive assembly 316 relative to brake pack 340. Accordingly, rotor shaft 312 extends through a component of brake housing 342 that supports brake pack 340 to enable brake pack 340 to engage a component of gear assembly 328 to provide retarding power to motor drive assembly 300.

Brake pack 340 is configured to engage with a component of gear assembly 328 to retard rotation of rotor shaft 312 and/or axle 324 (e.g., to enable performance of a braking operation, a steering operation, and/or the like). For example, brake pack 340 may include a set of friction discs and a set of separator plates. Each friction disc, of the set of friction discs, is situated between pairs of separator plates or between a separator plate and brake housing 342. The friction plates may be mechanically connected to carrier 336, and, therefore, may rotate in accordance with a rotation of carrier 336. In other examples, the friction plates of brake pack 340 may be mechanically connected to sun gear 330 and/or ring gear 334 (e.g., if ring gear 334 is not mechanically connected to brake housing 342). The separator plates are mechanically connected to (e.g., splined with) brake housing 342. Accordingly, when brake spring 346 applies a retarding force to brake pack 340 (e.g., according to a condition or operator input of machine 100), friction is increased between one or more of the friction discs and one or more of the separator plates of brake pack 340. In this way, torque from the retarding force is applied to axle 324 (e.g., via carrier 336) and rotor shaft 312 (e.g., via planet gears 332 and sun gear 330).

As indicated above, FIG. 3 is provided as an example. Other examples may differ from what is described with regard to FIG. 3. In some implementations, motor drive assembly 300 may include additional components, fewer components, different components, or differently arranged components than those shown in FIG. 3.

Figure 4:
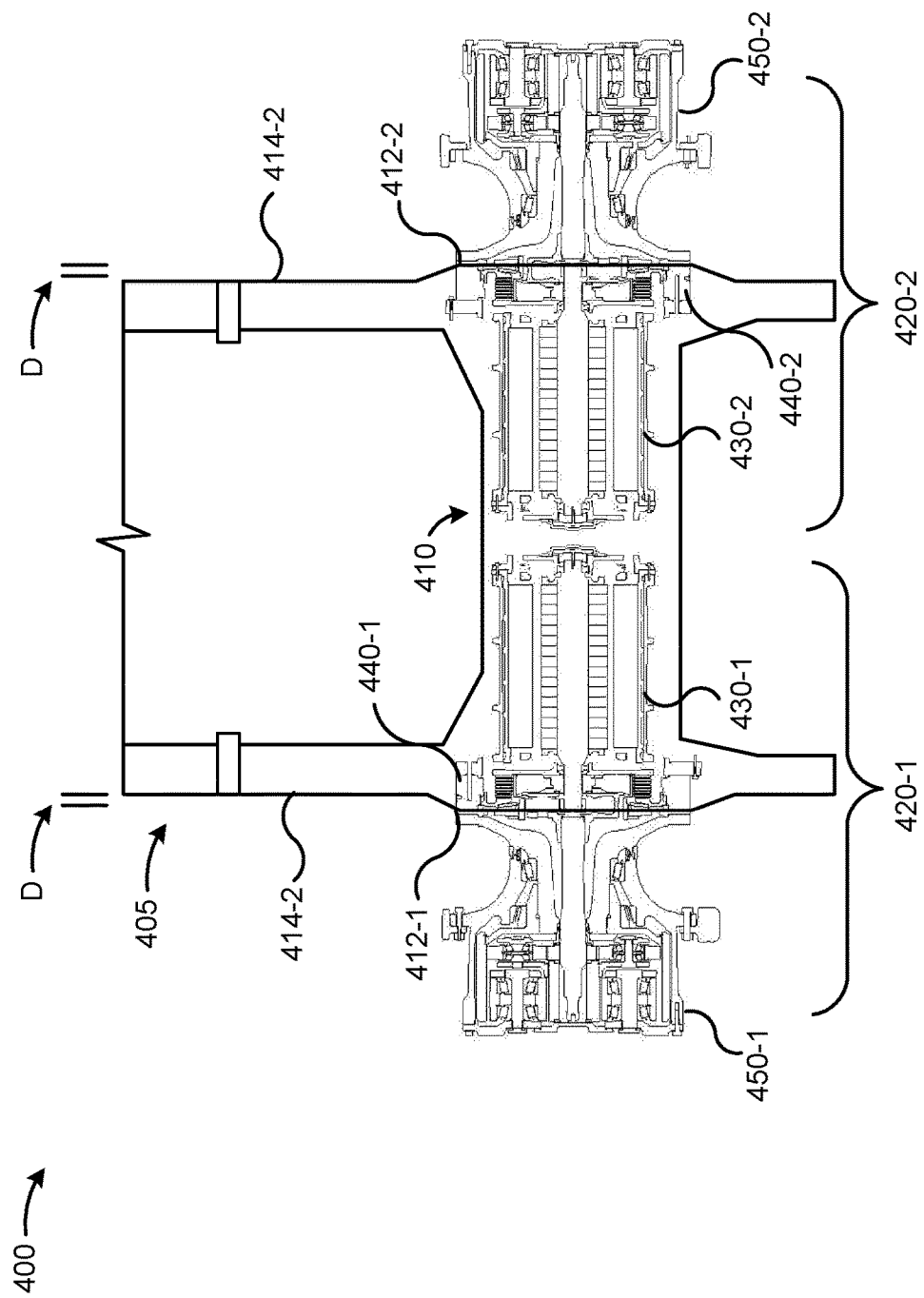
FIG. 4 is a top view of an example dual path electric powertrain within an example frame of the machine of FIG. 1.

FIG. 4 is top view of an example dual path electric powertrain 400 within a frame 405 of machine 100 of FIG. 1. Frame 405 may correspond to frame 105 of FIG. 1 and include an electric motor cavity 410 situated between frame mounts 412 on a left-side 414-1 and a right-side 414-2 of frame 405. The dual path electric powertrain 400 includes motor drive assemblies 420 (shown as "420-1" and "420-2" and corresponding to motor drive assembly 300 of FIG. 3). Accordingly, motor drive assemblies 420 may include and/or be fit within motor housings 430 (shown as "430-1" and "430-2" and corresponding to motor assembly 302), brake housings 440 (shown as "440-1" and "440-2" and corresponding to brake housing 342), and final drive housings 450 (shown as "450-1" and "450-2" and corresponding to final drive housing 320).

Frame 405 may be a frame of a relatively smaller machine (e.g., a smaller track-type tractor relative to a track-type tractor associated with frame 205 of FIG. 2). Accordingly, dimensions and/or a shape of electric motor cavity 410 may be relatively smaller than dimensions and/or a shape of electric motor cavity 210 of FIG. 2. However, performance requirements of motor drive assemblies 420 may be different from the performance requirements of motor drive assemblies 220 because a machine associated with frame 405 is smaller than a machine associated with frame 205 of FIG. 2.

In FIG. 4, an example electric motor cavity 410 of frame 405 may be configured to fit motor housings 430 and brake housings 440 within electric motor cavity 410. For example, as shown, electric motor cavity 410 may be formed from frame mounts 412 protruding a distance "D" from sides 415 of frame 405. In some implementations (e.g., depending on dimensions of the motor drive assemblies 420 and/or machine that is to use the motor drive assemblies 420), motor housings 430 and brake housings 440 of motor drive assemblies 420 may fit within a frame that does not include frame mounts protruding from sides of the frame.

As indicated above, FIG. 4 is provided as an example. Other examples may differ from what is described with regard to FIG. 4.

INDUSTRIAL APPLICABILITY

Developing and integrating a high-performance, long-life electric powertrain into a machine can be challenging due to size constraints of the machine (e.g., a size of a cavity to house the powertrain), inertia requirements of the powertrain, maximum weight constraints, cost constraints, and/or the like. Performance requirements (e.g., steering capability, drawbar pull and/or single track pull, propulsion capability, retarding capability, and/or the like) and/or durability standards previously required a dual path electric powertrain to be too large to fit within a desired compartment of a machine. For example, previous configurations of motor drive assemblies with motors that provide low enough inertia are too long to meet performance standards while still being able to fit coaxially between final drives of a track-type tractor. Accordingly, previous configurations required displacing and/or angling final drives relative to electric motors, which increases complexity, increases costs and/or quantities of components (e.g., to account for non-coaxially aligned components), and reduces durability (e.g., due to the increased number of working components and/or joints).

As described herein, a motor drive assembly for a coaxially aligned, dual path electric powertrain is configured to include a brake assembly and/or gear assembly configured between an electric motor and final drive that satisfies performance requirements for use in a track-type tractor while satisfying size constraints of the track-type tractor. Specifically, using a set of motor drive assemblies described herein, dual path electric powertrain 200 provides a compact modular design that provides a left electric motor and a right electric motor on a single axis, of a left final drive and right final drive, without increasing a track gauge of a machine (e.g., an existing track-type tractor of a particular size or having particular dimensions). The compact design may be achieved via a coaxially aligned dual path electric powertrain with shorter rotor shafts (relative to previous techniques), brake assemblies positioned externally from a powertrain compartment of a frame of the machine, and high-torque, switched reluctance motors with planetary gear reductions. In this way, at least a portion of a dual path electric powertrain, comprised of a pair of motor drive assemblies, as described herein, can fit into a same space as a mechanical transmission being replaced in a frame compartment of an existing machine (e.g., an existing track-type tractor that utilizes the mechanical transmission).

As described herein, to satisfy propulsion, steering, and/or braking requirements of a track-type tractor (e.g., a track-type tractor with an operating mass over 45,000 kilograms), a motor drive assembly can be configured to provide enough torque and steady state retarding power to facilitate effective braking capability and propulsion capability of a final drive, within a desired response window. Accordingly, pairs of motor drive assemblies, as described herein, can be coaxially aligned within a powertrain compartment of a machine, to form a dual path electric powertrain that provides enough torque, with low enough inertia, to satisfy minimum performance requirements of the machine and/or improve upon corresponding performance specifications of a similar machine that uses a mechanical powertrain.

As described herein, a configuration of a motor drive assembly (e.g., corresponding to motor drive assembly 300) that includes a brake assembly, as described herein, that can be utilized within a machine (e.g., a track-type tractor) to enable a machine operating mass to single track brake power ratio between 250 kg/kilowatt (kW) and 650 kg/kW (e.g., according to a desired responsiveness, a minimum duration of application, and/or the like without failing due to excessive temperature). Furthermore, a motor drive assembly, as described herein, may be included within a dual path electric powertrain of a track-type tractor to enable the track-type tractor to have a single track pull to machine operating weight ratio between 0.6 and 1.2, a machine operating mass to single track motor power ratio between 150 kg/kW and 300 kg/kW, a single track power to track gauge ratio between 90 and 225 kW/meter, and/or the like. Meanwhile, a set of motor drive assemblies, configured as described herein within a machine, may enable the machine to have a powertrain to machine inertia ratio between 1.5 and 3.5. Such performance specifications may be varied according to varying dimensions of the components of the motor drive assembly and/or varying positions of the components of the motor drive assembly relative to a frame of the machine.

Moreover, as described herein, a motor drive assembly may comprise modular components that are configured to enable access to individual assemblies (e.g., assemblies within the motor housings, brake housings, and/or final drive housings). This may improve serviceability of such components relative to current powertrain solutions. For example, serviceability of a brake assembly of the dual path electric powertrain is improved because the brake assembly of the dual path electric powertrain described herein can be positioned externally from an electric motor cavity or external side of a frame of a machine, thus reducing an amount of time to access the brake assembly and/or parts of the machine that are to be removed to access the brake assembly.

Furthermore, both motor drive assemblies of a dual path electric powertrain, configured as described herein, can be a same component and/or comprised of a same set of interchangeable components. Accordingly, the dual path electric powertrain, as described herein, can be configured from a limited quantity of interchangeable parts, thus reducing complexity and costs associated with designing and manufacturing components for different motor drive assemblies of the dual path electric powertrain.

What is claimed is:

1. A motor drive assembly for a machine that includes a first final drive assembly and a second final drive assembly, the motor drive assembly comprising:
   the first final drive assembly to engage a ground engaging element of the machine;
   an electric motor to provide torque to only the first final drive assembly, of the first final drive assembly and the second final drive assembly;
   a planetary gear assembly mechanically coupled to a rotor shaft of the electric motor and an axle of the first final drive assembly; and
   a brake assembly to engage a component of the planetary gear assembly to retard the rotor shaft and the axle.

2. The motor drive assembly of claim 1, wherein the electric motor is a switched reluctance motor.

3. The motor drive assembly of claim 1, wherein the torque is to be provided to the axle via the planetary gear assembly according to rotation of the rotor shaft or a braking force of the brake assembly.

4. The motor drive assembly of claim 1, wherein the component of the planetary gear assembly comprises at least one of:
   a carrier of the planetary gear assembly,
   a sun gear of the planetary gear assembly, or
   a ring gear of the planetary gear assembly.

5. The motor drive assembly of claim 1, wherein the component of the planetary gear assembly is mechanically connected to the axle.

6. The motor drive assembly of claim 5, wherein the component of the planetary gear assembly is one of:
   a carrier of the planetary gear assembly, or
   a ring gear of the planetary gear assembly.

7. The motor drive assembly of claim 1, wherein a ring gear of the planetary gear assembly is mechanically coupled to a brake housing of the brake assembly.

8. The motor drive assembly of claim 1, wherein the brake assembly includes a brake housing mechanically connected to a motor housing of the electric motor and a mounting flange of the first final drive assembly,
   wherein the brake housing is axially positioned between the motor housing and the mounting flange, and
   wherein the planetary gear assembly is enclosed within the brake housing.

9. The motor drive assembly of claim 1, wherein the brake assembly includes a wet disc brake assembly.

10. The motor drive assembly of claim 1, wherein the brake assembly includes:
    a set of friction discs mechanically connected to the component of the planetary gear assembly; and
    a set of separator plates mechanically connected to a brake housing of the brake assembly,
       wherein the brake assembly is to retard the rotor shaft and the axle according to an amount of friction between one or more of the set of friction discs and one or more of the set of separator plates.

11. A dual path electric powertrain for a machine comprising:
    a first motor drive assembly that is positioned toward a first lateral side of the machine, the first motor drive assembly comprising:
       a first final drive assembly to engage a first ground engaging element of the machine,
       a first electric motor to provide torque to the first final drive assembly,
       a first planetary gear assembly mechanically coupled to a first rotor shaft of the first electric motor and a first axle of the first final drive assembly, and
       a first brake assembly to engage a component of the first planetary gear assembly to retard the first rotor shaft and the first axle; and
    a second motor drive assembly positioned toward a second lateral side of the machine that is opposite the first lateral side, the second motor drive assembly being coaxially aligned with the first motor drive assembly and comprising:
       a second final drive assembly to engage a second ground engaging element of the machine,
       a second electric motor to provide torque to the second final drive assembly, a second planetary gear assembly mechanically coupled to a second rotor shaft of the second electric motor and a second axle of the second final drive assembly, and a second brake assembly to engage a component of the second planetary gear assembly to retard the second rotor shaft and the second axle.

12. The dual path electric powertrain of claim 11, wherein the second motor drive assembly is coaxially aligned with the first motor drive assembly according to:
a rotational axis of the first rotor shaft and the first axle being coaxial with a rotational axis of the second rotor shaft and the second axle.

13. The dual path electric powertrain of claim 11, wherein the first motor drive assembly and the second motor drive assembly have at least one of:
a same set of dimensions, or
a same set of performance specifications.

14. The dual path electric powertrain of claim 11, wherein the first motor drive assembly and the second motor drive assembly have:
a same type of final drive assembly,
a same type of electric motor,
a same type of planetary gear assembly, and
a same type of brake assembly.

15. The dual path electric powertrain of claim 11, wherein the first planetary gear assembly and the second planetary gear assembly provide a same gear reduction.

16. A machine comprising:
a power source; and
a dual path electric powertrain powered by the power source, the dual path electric powertrain comprising:
a left-side motor drive assembly positioned on a left-side of the machine, the left-side motor drive assembly comprising:
a left-side final drive assembly to drive a left-side track of the machine,
a left-side electric motor to provide torque to the left-side final drive assembly,
a left-side planetary gear assembly mechanically coupled to a left-side rotor shaft of the left-side electric motor and a left-side axle of the left-side final drive assembly, and
a left-side brake assembly to engage the left-side planetary gear assembly to retard the left-side rotor shaft and the left-side axle; and
a right-side motor drive assembly positioned on a right-side of the machine, the right-side motor drive assembly being coaxially aligned with the left-side motor drive assembly and comprising:
a right-side final drive assembly to drive a right-side track of the machine,
a right-side electric motor to provide torque to the right-side final drive assembly,
a right-side planetary gear assembly mechanically coupled to a right-side rotor shaft of the right-side electric motor and a right-side axle of the right-side final drive assembly, and
a right-side brake assembly to engage the right-side planetary gear assembly to retard the right-side rotor shaft and the right-side axle.

17. The machine of claim 16, further comprising:
a blade for moving ground material,
wherein a ratio of a width of the blade to a track gauge is between 1.4 and 2.6,
wherein the track gauge corresponds to a distance between the left-side track and the right-side track.

18. The machine of claim 16, further comprising:
a frame that includes:
a left-side mount;
a right-side mount; and
an electric motor cavity situated between the left-side mount and the right-side mount,
wherein at least a portion of the left-side electric motor and a portion of the right-side electric motor are positioned within the electric motor cavity,
wherein the left-side brake assembly is positioned outside of the electric motor cavity, and
wherein the right-side brake assembly is positioned outside of the electric motor cavity.

19. The machine of claim 16, further comprising:
a frame that includes:
a left-side mount;
a right-side mount; and
an electric motor cavity situated between the left-side mount and the right-side mount,
wherein at least a portion of the left-side electric motor and a portion of the right-side electric motor are positioned within the electric motor cavity,
wherein the left-side brake assembly is positioned inside of the electric motor cavity, and
wherein the right-side brake assembly is positioned inside of the electric motor cavity.

20. The machine of claim 16, wherein the machine has an operational mass of at least 45,000 kilograms, and
wherein the left-side motor drive assembly and the right-side motor drive assembly are configured to provide at least one of:
a single track pull to machine operating weight ratio of 0.6 to 1.2,
a machine operating mass to single track brake power ratio of 250 to 650 kilograms per kilowatt,
a machine operating mass to single track motor power ratio of 150 to 300 kilograms per kilowatt,
a powertrain to machine inertia ratio of 1.5 to 3.5, or
a single track power to track gauge ratio of 90 to 225 kilowatt per meter.

* * * * *